Sept. 8, 1959  G. B. NORMAN  2,902,715
EXTRUSION-CONSOLIDATION DIE
Filed July 2, 1956

INVENTOR.
GEOFFREY BERTRAND NORMAN
BY
Bruce & Brosler
His Attorneys

United States Patent Office 2,902,715
Patented Sept. 8, 1959

2,902,715
EXTRUSION-CONSOLIDATION DIE

Geoffrey Bertrand Norman, Heaton Moor, Stockport, England

Application July 2, 1956, Serial No. 595,183

4 Claims. (Cl. 18—12)

My invention relates to the extrusion of moldable material and more particularly to an extrusion die for use in such connection.

Conventional dies, whether cylindrical or planar, are provided with a plurality of extrusion holes therethrough. At the compression or inlet end of each, the die is usually countersunk to assist in guiding material into the extrusion passages. Moldable material to be extruded, is fed in bulk to the compression side of the die in front of rollers or other form of compression means, whereupon such material is compressed into the extrusion passages. If conditions are favorable, the material, after a number of passes of the compression means, emerges as a compacted string of material from each extrusion passage, from which material, pellets are formed by periodically fracturing or otherwise severing the extruded material as it emerges from the die.

Such dies have presented a number of problems. Moldable material to be pelleted, varies widely in composition. Some are quite viscous and difficult to consolidate. Others compact readily but die requirements are quite critical, as a particular die might work well with one material and not even start with a material differing but slightly from the other. Ofttimes even a slight variation in a particular material may cause the die to choke up and stop producing. Such critical characteristics of the conventional extrusion die exist in spite of the fact that in such dies, the frictional resistance of the wall surfaces of the extrusion passages is minimized by smoothing such surfaces to a high polish following the drilling and reaming of the passages. When it is realized that a die may embody as many as 2000 and more extrusion passages, the operation of polishing the walls of all of such passages to a smooth mirror-like finish adds immeasurably to the ultimate cost of manufacture of such dies.

Another problem encountered in connecticn with conventional dies, is that of die wear. Moldable material in most cases possesses abrasive characteristics, and this results in considerable wear of the die face, particularly along the path or track of the compression means. When the holes are countersunk, the wear is aggravated because the material, under the action of the extrusion means, is partly forced out of and across the far edge of each such countersink under pressure, and such action produces wear at the edge of each countersink, along with the wear of the die surface over which the extrusion means passes. This of course results in the development of heat and probably accounts in large measure for the power input to the machine.

Also, it has been found that the material compacted in the countersinks quite often fractures at the entrances to the extrusion passages and pops out of their recesses in the form of relatively hard frusto-conical shaped buttons. These of course of course mix with the free material on the face of the die and cause difficulties.

Among the objects of my invention are:

(1) To provide a novel and improved extrusion die and method of making the same;

(2) To provide a novel and improved extrusion die which is less critical than the conventional die and capable of effectively handling a range of moldable materials without difficulty;

(3) To provide a novel and improved extrusion die having increased output over a comparable conventional die for the same power input;

(4) To provide a novel and improved extrusion die in which the surface wear is materially less than with a conventional die;

(5) To provide a novel and improved extrusion die in which the extrusion passages may be left in the "rough" state produced by a drilling or reaming operation, and require no subsequent polishing;

(6) To provide a novel and improved die having unpolished extrusion passages and yet capable of operating considerably cooler than a conventional die with highly polished passages.

(7) To provide a novel and improved extrusion die at less cost than a comparable conventional die with polished extrusion passages, and which will outperform such conventional die;

(8) To provide a novel and improved method of making extrusion dies, which enables such die to be experimentally adjused to pellet a particular material.

Additional objects of my invention will be brought out in the following description of a preferred embodiment of the same taken in conjunction with the accompanying drawings wherein.

Figure 1:
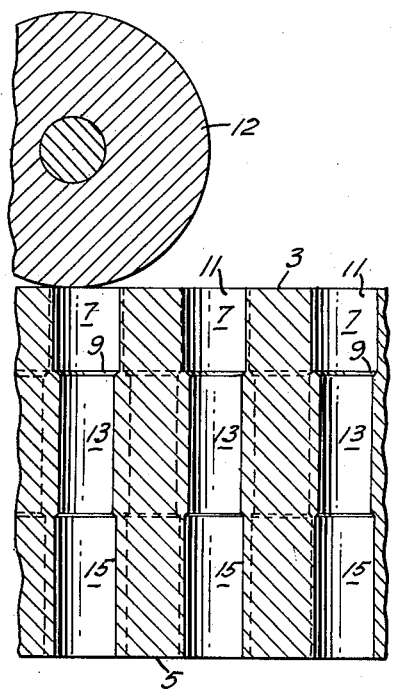
Figure 1 is a sectional view taken in the plane 1—1 of Figure 2, through a fragmentary portion of an extrusion die and depicting features of the present invention.
Figure 2:
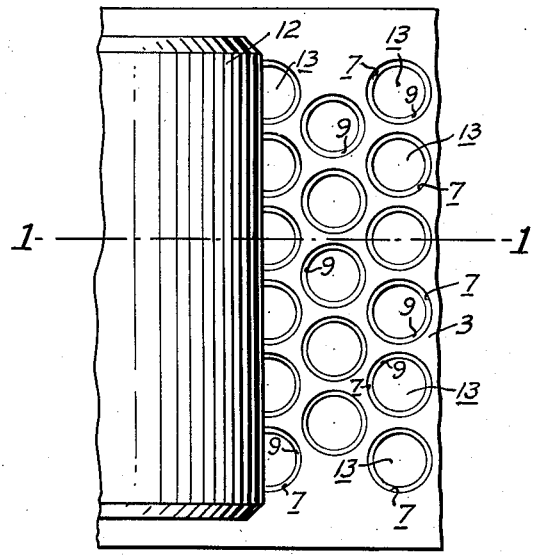
Figure 2 is a plan view looking at the compression side of Figure 1.

Referring to the drawings for details of my invention in its preferred form, the die is of metal properly treated for wear and strength, and has a compression side 3 and a discharge side 5. In the compression side of the die are formed a plurality of counterbores to provide precompaction chambers 7 each having a bottom 9, and a side wall 11 paralleling the axis of the chamber. The bottom may be flat though preferably the counterbore should terminate at the bottom in a shallow conical surface.

Over the compression side 3 of the die runs one or more compression means such as a roller 12 for example.

Extending from the bottom of each of the precompaction chambers, is an extrusion passage 13 of smaller cross-sectional area than that of its associated precompaction chamber. However, these extrusion passages differ from those of conventional dies, in that the surface of each of such passages is in the "rough" state produced by the drilling or reaming of the passage. Nothing further need be done in the die of the present invention toward treating such passages. In other words, applicant has discovered that an extrusion passage, when combined with a precompaction chamber of the character described, need no longer be polished in the manner of extrusion passages of conventional dies, thus eliminating the tedious and costly operations which such polishing entailed.

Further, applicant has found, that the relative roughness of the surfaces of his extrusion passages constitutes a decided advantage in his die when, coupled with the precompaction chamber. Full compaction of material in the extrustion passage to the desired consistency of the finished pellet, can now be realized in a shorter length of passage than is required in a comparable die of the conventional type, and the degree to which the extrusion passage may thus be shortened is such that the practical thickness of the die is no longer dictated, as with conventional dies, by the length of extrusion passage required to compact the material to the desired degree, but the die thickness is now controlled by the thickness of die required to withstand the stresses developed in such die. This permits of a thinner die than conventional and where the length of passage necessary turns out to be less than the thickness of die required to withstand the stresses, the desired length of extrusion passage can be readily determined experimentally by counterboring the die from the discharge side thereof, to a point which will bring about the desired density in the finished pellet. Such permissible reduction in the thickness of dies thus results in further economies in the production of dies under the present invention.

In many instances therefore, the die may have counterbores in its discharge side.

When the die is thus adjusted for the extrusion of a particular material, I have found that the same die without any further alterations, will work quite satisfactorily on many other materials, some of which may vary substantially in many of their characteristics from the particular material for which the die was originally intended.

The output capacity of such die is found to run considerably higher than that of a comparable die of the cenventional type with the same or less power input. Also my improved die has been found to run much cooler than that of a comparable conventional type die.

Just what, if any, must the relationship be, between the precompaction chamber and the extrusion passage to realize the most efficient results in the die of my invention, is not known to me at the present time, with any degree of certainty. Inasmuch as there are several variables involved in the wide variety of moldable materials which are pelleted for the market, a specific mathematical formula which takes into consideration the many variables which one would encounter in such wide range of materials, would be extremely difficult to evolve. The relationship, fortunately, is not overly critical in the die of my invention. In designing a particular die to produce pellets of a specified diameter, up to approximately 3/16 inch for example, I have found that very satisfactory results are obtainable by making the counterbore or precompaction chamber to a diameter substantially of the order of 1/32 of an inch larger than the diameter of the extrusion passage, and to a volume substantially equal to the amount of pellet material capable of being pressed into the precompaction chamber in a single pass of a compression means traversing the precompaction chamber along the compression side of the die. For pellets of larger diameters, I prefer to make the precompaction chambers proportionately larger in diameter. Even this does not appear critical, so long as the walls are parallel to the axes of the chambers and the chambers have bottom surfaces forming shoulders at the entrances to the extrusion passages.

The length of the extrusion passage as measured from the bottom of the precompaction chamber, may then be readily determined experimentally, merely by counterboring from the discharge side of the die to the point where the desired density of the extruded material is obtained. This may leave an extrusion passage which, in most instances, will have a length of from 1.5 to 6 times the depth of the precompaction chamber. As previously indicated, the dimensions have been found to be not overly critical, and the die once completed, will satisfactorily handle other materials, the characteristics of which may vary somewhat from the particular material for which the die was initially designed.

Just why my improved die produces such amazing and unexpected results as compared with dies of the conventional type wherein the extrusion passages are countersunk and the surfaces of the passages are polished to a mirror like finish, is not completely apparent to me at this time. However, in a die according to my invention, one of the effects of the counterboring of the apertures to form precompaction chambers, is that the surface area of the die face around the apertures is reduced, thus affording an easier flowpath for the material to enter the apertures, without the mechanical strength of the die being in any way reduced at the area of greatest stress, i.e. at the extrusion section of the hole; the horsepower required for spreading the material into such apertures is thereby reduced. Further, in the process of moulding and extruding plastic materials the degree of compaction required is conventionally attained as a result of the surface friction in the bore of the aperture causing the flow of material to be retarded against the pressure exerted by the rolls as they pass over the material at the entry to the aperture, whereas in a die according to my invention the material on entering the precompaction section of the aperture assumes the shape dictated by the walls thereof and is then compacted at the base of the preforming chamber as a result of the resistance encountered at the shoulder formed by the change of cross section of the aperture at the entry to its extrusion section. The degree of compaction assured by the resistance developed at this point of change of cross-section is equivalent to that which would result from forcing the material through a comparatively long extrusion aperture of the conventional type and therefore in my die the extrusion length may be correspondingly shorter and its surface correspondingly less highly finished than in a conventional type of aperture because its duty is largely to shape the already compacted string of material rather than to provide resistance in order to compact it. It has been found by experiment that the power required to compact material at the base of a precompacting chamber of the type described is less than would be needed in an otherwise plain extrusion aperture to attain the same measure of compaction, and it has also been found by experiment that with a die in accordance with my invention I can reduce the amount of heat developed in the die during the moulding of certain materials by reducing the length of the extrusion section of the aperture without reducing the measure of compaction in the finished string.

I have further discovered in connection with the operation of my new die, that wear on the surface of the die is considerably less than that experienced in connection with the dies of the conventional type previously described. In analyzing the situation, it is believed that such reduced wear on the surface of the die is attributable to the fact that the surface areas at the bottoms of the precompaction chambers may be considered as the equivalent of corresponding areas of the compression surface which have been removed from the grinding action of the rollers or other compression elements. Further, such material as enters the precompaction chambers becomes trapped therein and has no place to go but through the die.

Comparative tests have shown an amazing reduction in surface wear of a die embodying the features of the present invention over dies of conventional design.

It will be apparent from the foregoing, that my improved die fulfills all the objects of my invention, and while I have described such invention in its preferred form, the invention as illustrated and described, is capable of alteration and modification without departing from the underlying principles involved and I, accordingly, do not desire to be limited in my protection in the specific details illustrated and described, except as may be necessitated by the appended claims.

I claim:

1. An extrusion consolidation die for a pellet mill of the type having compression means movable over a surface of the die, said die having a compression side, a discharge side, a plurality of precompaction chambers in the compression side of said die, said precompaction chambers, each having a bottom, and all its side wall surface areas paralleling the axis of the chamber, said die further having an extrusion passage extending from the bottom of each precompaction chamber with each such extrusion passage being of smaller cross-sectional area than that of its associated precompaction chamber and having an extrusion surface formed by a relatively rough removal of metal and left unpolished.

2. An extrusion consolidation die for a pellet mill of the type having compression means movable over a surface of the die, said die having a compression side, a discharge side, a plurality of cylindrical precompaction chambers in the compression side of said die, said die further having an extrusion passage extending from the bottom of each precompaction chamber with each such extrusion passage being of smaller cross-sectional area than that of its associated precompaction chamber and having an extrusion surface formed by a relatively rough removal of metal and left unpolished.

3. An extrusion consolidation die for a pellet mill of the type having compression means movable over a surface of the die, said die having a compression side, a discharge side, a plurality of cylindrical precompaction chambers in the compression side of said die, said die further having a cylindrical extrusion passage extending from the bottom of each precompaction chamber with each such extrusion passage being of smaller diameter than that of its associated precompaction chamber and having an extrusion surface formed by a relatively rough removal of metal and left unpolished.

4. An extrusion consolidation die for a pellet mill of the type having compression means movable over a surface of the die, said die having a compression side, a discharge side, a plurality of precompaction chambers in the compression side of said die, said precompaction chambers, each having a bottom and all its side wall surface areas paralleling the axis of the chamber, said die further having an extrusion passage extending from the bottom of each precompaction chamber with each such extrusion passage being of smaller cross-sectional area than that of its associated precompaction chamber and having an extrusion surface formed by a relatively rough removal of metal and left unpolished, said die in addition having in the discharge side thereof, a counterbore at each of said extrusion passages.

References Cited in the file of this patent

UNITED STATES PATENTS

| | | |
|---|---|---|
| 1,228,495 | Tanzi | June 5, 1917 |
| 2,059,486 | Payne et al. | Nov. 3, 1936 |
| 2,063,404 | Selman | Dec. 8, 1936 |
| 2,245,608 | Rogers | June 17, 1941 |
| 2,341,555 | Jones | Feb. 15, 1944 |
| 2,461,640 | Hallberg | Feb. 15, 1949 |
| 2,491,588 | Shively | Dec. 20, 1949 |
| 2,675,768 | Hehn | Apr. 20, 1954 |
| 2,677,148 | Webb | May 4, 1954 |
| 2,757,621 | Johnson | Aug. 7, 1956 |
| 2,764,952 | Meakin | Oct. 2, 1956 |
| 2,778,250 | Ploegsma | Jan. 22, 1957 |

FOREIGN PATENTS

| | | |
|---|---|---|
| 58,010 | Holland | Aug. 15, 1946 |